United States Patent [19]

Purcell

[11] Patent Number: 4,528,609

[45] Date of Patent: Jul. 9, 1985

[54] METHOD AND APPARATUS FOR PROTECTING SUPERCONDUCTING MAGNETIC ENERGY STORAGE SYSTEMS DURING RAPID ENERGY DISSIPATION

[75] Inventor: John R. Purcell, San Diego, Calif.

[73] Assignee: GA Technologies Inc., San Diego, Calif.

[21] Appl. No.: 410,499

[22] Filed: Aug. 23, 1982

[51] Int. Cl.³ ............................................ H02H 12/00
[52] U.S. Cl. ..................................... 361/19; 174/15 S
[58] Field of Search ........... 361/19; 174/15 CA, 15 S; 335/216; 62/45, 55, 505

[56] References Cited

U.S. PATENT DOCUMENTS

| | | | |
|---|---|---|---|
| 3,301,937 | 11/1964 | Burnier et al. | 174/15 |
| 3,458,763 | 4/1967 | Kunzler | 317/13 |
| 3,611,078 | 10/1971 | Massar et al. | 317/13 |
| 3,691,491 | 9/1972 | Massar et al. | 335/216 |
| 4,036,618 | 7/1977 | Leonard et al. | 62/55 |
| 4,039,740 | 8/1977 | Iwata | 174/15 |
| 4,048,437 | 9/1977 | Vander Arend et al. | 174/15 |

OTHER PUBLICATIONS

"1-GWh Diurnal Load-Leveling Superconducting Magnetic Storage System Reference Design", designated LA-7885-MS, vol. 1, by Los Alamos Scientific Laboratory, P.O. Box 1663, Los Alamos, NM, 87545. (Sep., 1979).

*Primary Examiner*—Patrick R. Salce

*Attorney, Agent, or Firm*—Fitch, Even, Tabin & Flannery

[57] ABSTRACT

A method and apparatus are provided for protecting a superconducting magnetic energy storage system having a coil from damage caused by a change of state of at least a portion of the coil from superconducting to normal conducting, and the consequent conversion of stored electrical energy to heat. A thermal capacitance is placed in thermal contact with the coil. The thermal capacitance is formed of a substance, such as nitrogen, which is solid at operating pressure at a temperature substantially above the transition temperature of the coil and that vaporizes below the temperature at which the system is damaged. The volume of the substance is sufficient to provide thermal capacity upon vaporization of the substance to dissipate substantially all of the stored energy without permitting the system to overheat. Liquid helium is provided in thermal contact with the substance and the coil for normally cooling the coil and the thermal capacitance to a temperature which is low enough so that the coil is in its superconducting state and the substance becomes substantially solid. Means are also provided for propagating any normal conducting region that is present for more than a very short time over substantially all of the coil by removing the helium from thermal contact with a substantial portion of the coil. In this manner, the substance absorbs the stored energy while maintaining the temperature of the system below the temperature at which it is damaged.

9 Claims, 2 Drawing Figures

U.S. Patent  Jul. 9, 1985  4,528,609
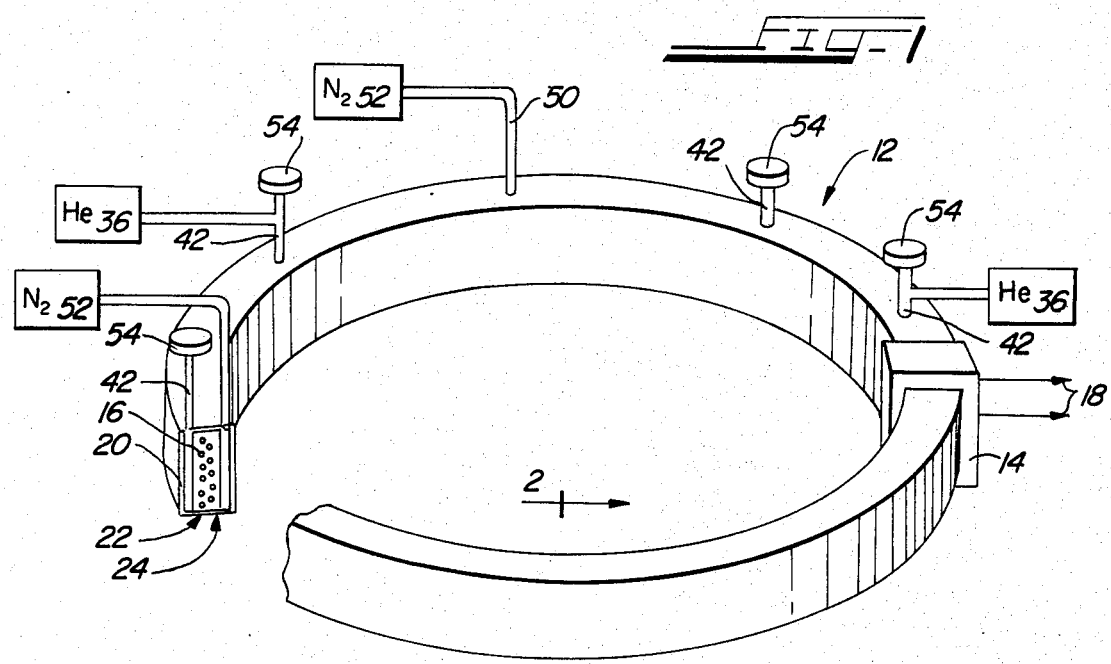
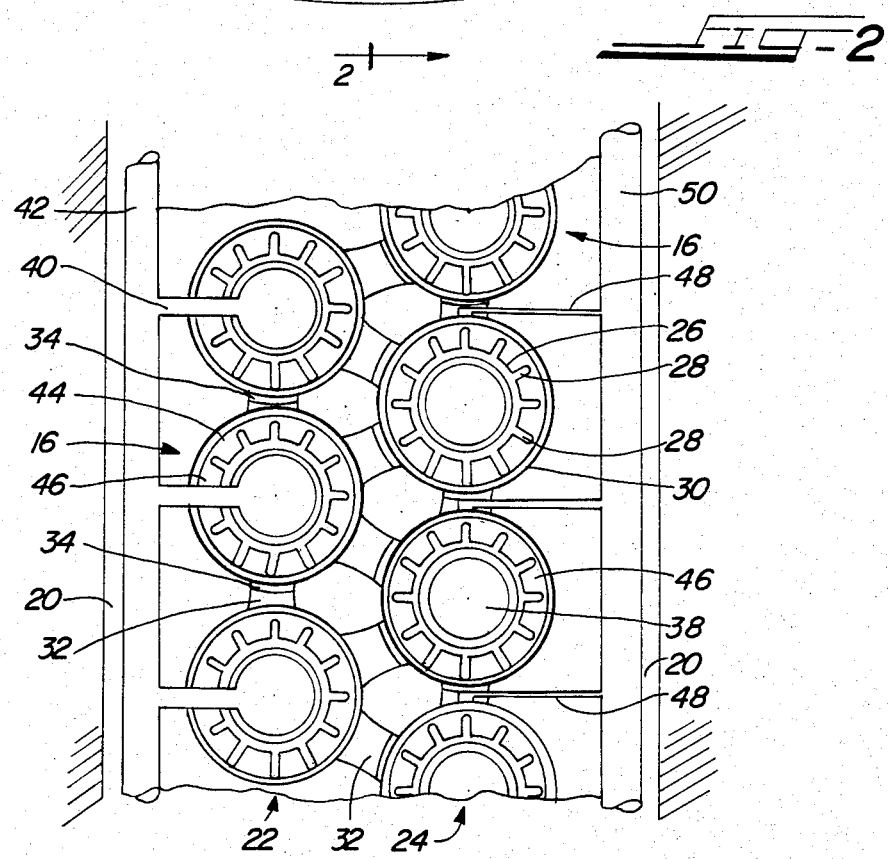

METHOD AND APPARATUS FOR PROTECTING SUPERCONDUCTING MAGNETIC ENERGY STORAGE SYSTEMS DURING RAPID ENERGY DISSIPATION

BACKGROUND OF THE INVENTION

This invention relates to an apparatus and method for protecting superconducting magnetic energy storage systems from damage upon a sudden loss of superconductivity causing a rapid dissipation of the stored energy, and more particularly, to the use of suitable thermal capacitance material coupled to a superconducting coil system for absorbing heat generated in the system in the event the coil suddenly becomes nonsuperconducting due to a malfunction or the like while storing a substantial amount of energy.

An informal report by the Los Alamos Scientific Laboratory in September 1979 entitled "1-GWh Diurnal Load-Leveling Superconducting Magnetic Energy Storage System Reference Design", designated "LA-7885-MS, Vol. 1", outlined a design for a load-leveling system for electric utilities. That system increases the overall efficiency of commercial power plants by storing energy in a large, underground superconducting magnetic energy storage coil during periods of low demand, and using the stored energy during peak periods. With such a system, existing fossil fuel generators operate at a higher average percentage of their rated output, and the capacity of the generating system does not have to be increased just to meet the peak demand, which may last only a short time each day. The growth of the nuclear power industry has increased interest in load-leveling systems because the power output of nuclear fission power plants is not easily reduced during periods of low demand. Without a load-leveling system, a substantial amount of power is generated and lost, which is very inefficient.

Load-leveling systems are already in use n this country. A load-leveling system near Ludington, Michigan uses power generated during periods of low demand to pump water from Lake Michigan to a holding area above the lake water level. When demand approaches or exceeds the operating capacity of the generating system, the stored water is released through turbine generators, which produce additional electrical power. Thus, during slack periods electrical energy is converted into kinetic energy by the pumps which elevate the water. A substantial portion of that energy is stored as potential energy in the elevated water in the holding area, and is again converted into kinetic energy when the water is released. This kinetic energy is converted into electrical energy by the generators. While this system increases the overall utility of the generating system and lowers average cost per kilowatt-hour, it is not efficient itself because the energy is converted several times at less than 100 percent efficiency each time. A superconducting magnetic energy storage (SMES) system is particularly suitable for load-leveling because the electrical energy remains as electromagnetic energy and is not converted into mechanical energy. Such a system may have a high efficiency in the range of 80 percent to 95 percent.

The power storage capability of an SMES system must be fairly large to be cost effective, because the cost per unit of energy is generally inversely proportional to the cube root of the maximum energy which may be stored in the system. A power capacity of about one gigawatt-hour (1 GWh) is suggested in the Los Alamos report. The proposed superconducting coil would have about 4,280 turns, an average radius of about 66 m, a height of about 44 m, and an operating current at full charge of about 50 kA. Various other coil designs have been suggested by others.

The Los Alamos superconducting coil would be housed beneath the ground in a vacuum, and the current carrying conductor would be cooled by liquid helium or the like. Filament protection apparatus might be provided which protects the coil if it becomes nonsuperconductive and begins conducting in a normal manner with relatively high resistivity for a very brief period of time. Such state changes may occur when the coil starts to charge or discharge.

A generally known approach to filament protection involves embedding or lacing superconductor filaments with high purity aluminum or the like. The aluminum has a higher resistance than the filaments when the latter are in a superconductive state, and a lower resistance than the filaments when they are in a normal state. If the coil becomes nonsuperconductive, the current transfers to the aluminum, which dissipates the heat generated by the current. When the filaments become superconductive again, the current returns to the filaments, which then have a lower resistance. Such state changes are normal, and do not relate to this invention.

Abnormal state changes in which the coil is nonsuperconductive for more than a very brief period may generate more heat than the protection apparatus can absorb. The apparatus of this invention protects the coil under such circumstances. Such abnormal changes are likely to occur at least once over a period of several years, for although the system is designed for completely stable and reliable operation, at least a portion of the coil could become nonsuperconductive for an abnormal length of time due to a sudden loss of coolant, loss of vacuum or other malfunction. A superconducting coil carrying current in the range of 50 kA generates a large voltage drop if it suddenly becomes nonsuperconductive (normal), and the energy stored in the coil rapidly heats the normal region, generating tremendous heat in a short period of time. The coil must be protected from such over-heating and excessive voltage, or it may be severely damaged.

A common method of protecting a superconducting coil in the event of a malfunction is to divide the coil into small energy blocks by the use of multiple current leads, and provide a dump resistor and switch for each block. In the system suggested in the Los Alamos report, the number and size of the coil windings, and the large current density in the coil, make such an approach impractical because several hundred switches, resistors, and current lead pairs would be required, which would increase the capital and maintenance cost of the system intolerably. The switches would be located outside the superconductor at about room temperature, heat would propagate through the current leads, and additional energy would be required to cool the system.

Another method of protection is to permit the coil, energy storage system and surrounding supports for the storage system to absorb the heat generated by the stored energy. Since the outer support system, which may be bedrock or the like, is thermally isolated from the conductor, substantially all of the energy would be absorbed by the conductor and inner structure of the coil. To absorb such a substantial amount of heat, the area of the coil and surrounding apparatus would have to be increased dramatically to reduce the energy per unit mass. Such a solution would greatly increase the size of the system, and would be expensive and impractical.

The potentially destructive current produced by the sudden collapse of a magnetic field in a superconducting coil may be transferred to a secondary winding and external dumping circuit which is cooled by gaseous helium, as suggested in U.S. Pat. No. 3,458,763. The gaseous helium is produced from liquid helium normally used to cool the conductor, which is vaporized when the coil becomes nonsuperconducting. The gaseous helium is passed over a resistive load in the dumping circuit before it is released from the system. Such a system is impractical for the application contemplated in the Los Alamos report, however, because it would require substantial additional material at great expense. Thus, there is a need for an apparatus and method for economically protecting a superconducting coil from damage which may be caused by a rapid conversion of stored energy which may occur if the coil suddenly becomes nonsuperconducting for more than a very brief period.

Accordingly, one aspect of this invention is to provide a new and improved apparatus and method for protecting a superconducting coil from damage due to loss of its superconductive state and consequent conversion of stored energy.

Another aspect is to provide a practical new and improved method and apparatus for protecting a superconducting coil from damage due to a sudden dissipation of energy.

SUMMARY OF THE INVENTION

In keeping with one aspect of this invention, a superconducting magnetic energy storage system having a coil storing energy in its magnetic field is protected from damage due to a change of state of at least a portion of the coil from superconducting to normal conducting by providing a thermal capacitance in thermal contact with substantially all of one surface of the coil. The thermal capacitance includes a substance which is solid at the operating pressure at a temperature substantially above the transition temperature of the coil conductor material, and vaporizes at a temperature at or below a safe temperature at which the system is not damaged. Enough of the substance is provided so that the thermal capacity of the substance from the solid state through vaporization is sufficient to dissipate substantially all of the stored energy without permitting the system to heat above the safe temperature. Nitrogen or any other suitable material may be used for this purpose. Coolant such as liquid helium in thermal contact with another surface of the coil maintains the coil in a superconducting state and the substance in a solid state under normal operating conditions. If a sudden loss of coolant or vacuum causes a portion of the coil to go to its normal conducting state, the energy stored in the coil is converted to heat. This boils the helium locally and drives it from contact with the rest of the coil so that the region of normal conductivity propagates quickly throughout the coil, reducing the heat energy density in the initial normal region of the system, and the substance absorbs the excess heat, vaporizes and escapes from the system.

BRIEF DESCRIPTION OF THE DRAWINGS

The above-mentioned and other features of this invention and the manner of obtaining them will become more apparent, and the invention itself will be best understood by reference to the following description of the invention, particularly when taken in conjunction with the accompanying drawings in which:

FIG. 1 is a perspective view, partly diagramatic, of a proposed superconducting magnetic energy storage coil system which includes the apparatus for coil protection of this invention; and FIG. 2 is a vertical sectional view of the coil system of FIG. 1 taken along lines 2—2.

DESCRIPTION OF THE PREFERRED EMBODIMENTS

A portion of a load-leveling system for improving the overall efficiency of commercial power generating systems is shown in FIG. 1. The load-leveling system includes a superconducting energy storage system 12 having a generally circular configuration when viewed from above. Apparatus 14, shown in block form in FIG. 1, is used to transfer energy generated in commercial power plants to a coil 16 through leads 18 during periods of low demand, and to supply energy from the coil 16 to the generating system during periods of high demand. Apparatus 14 is generally known in the art, and is described in the Los Alamos report previously discussed.

The coil 16 is thermally isolated in the ground in a vacuum chamber 20, and may have a radius from about 66 m to a kilometer, and a height from about 44 m to about 15 m. It may include more or fewer radial turns than the two shown, and as many total turns as are required. Many design parameters could be used, if desired. The Los Alamos report suggests that the coil have five radial turns, and about 4,280 total turns, an average radius of about 66 m and a height of about 44 m. That proposed coil would have an operating current at full storage of about 50 kA. If a malfunction occurred, the energy in the coil would likely be converted to heating over a period of about 3 to 5 minutes.

The energy storage system 12 shown in FIG. 1 includes the coil 16, which has two radial turns 22, 24, and might have about 100 total turns (only 11 being shown), a radius of 500 m and a height of about 15 m. The operating current could be about 400 kA. The stored energy is a function of current multiplied by the number of turns, and could store several thousand megawatt-hours of power, if desired.

The coil 16 has a generally hollow, cylindrical form, and is encased in a tube 26 having a plurality of fins 28 extending outward radially from the tube 26 to a cylindrical case 30. The case 30, the fins 28 and the tube 26 may be made of any suitable heat conducting material which is not superconductive, such as an aluminum alloy or the like. The fins 28 along the bottom of the tube 26 may rest on the case 30 to support the coil 16, but generally do not seal the interface between the case 30 and the fins 28.

The coil 16 includes a plurality of superconductive wires made of niobium titanium filaments or the like which are secured to the tube 26 for good thermal contact, and may have a generally helical twist. The wires are laced with high purity aluminum for filament protection by providing improved thermal conductivity and electrical stabilization during brief periods of time in which the wires change to a normal conducting state during normal operation.

A support structure 32 is provided for the coil 16, as seen in FIG. 2. The support structure 32 may be any suitable construction such as the bricks shown, and may be any suitable heat transferring material which is functional at the operating temperatures of the coil 16 and is not superconductive. Aluminum bricks might be used for the structure 32. Electrical insulators 34 are provided as needed to prevent adjacent turns of the coil 16 from shorting.

Liquid helium is produced in refrigeration units 36, and is introduced into the central open section 38 of the coil 16 (FIG. 2) through a plurality of lines 40 and manifolds 42, which are provided as needed. The helium may be poured in through a single line 40, through several lines 40, or through several manifolds 42 and lines 40 distributed around the periphery of the system 12, depending upon the refrigeration system. Generally, the liquid helium need not be circulated through the coil 16 because it is cooled below the helium transition temperature of 2.2° K. Below the transition temperature, the helium behaves as a superfluid, and has infinite thermal conductivity. Any heat generated in the storage system 12 or absorbed from the ground outside the system during normal operation will be conducted to the outside surface of the helium at the refrigeration units 36, and a small amount of helium will boil away. The helium may be replenished as required.

The liquid helium cools the coil 16 to a temperature of about 1.8° K., which is below the temperature at which the filaments become superconducting. The transition temperature of the niobium titanium filaments is between about 2° K. and about 10° K., depending on the strength of the magnetic field in the coil 16.

Outside the coil 16 and in thermal contact therewith through the tube 26 is disposed a layer 44 of nitrogen or some other suitable substance which has a thermal capacity from the solid state through vaporization which is sufficient to dissipate substantially all of the heat generated by the stored energy if a malfunction causes the coil 16 to become nonsuperconducting (go normal) for more than a very brief period of time.

Since the energy is converted in a relatively short period of time, a substantial amount of heat is generated very quickly, which would create a great temperature gradient in the components of the system 12 in the absence of the thermal capacity. Such temperature gradients would cause thermal expansion at different rates in the system components, which could damage or destroy the coil. The nitrogen or other substance is provided to absorb this excess heat without permitting the coil to be heated beyond a safe temperature at which the support structure 32 and other components of the system 12 are not damaged by thermal expansion.

Although the temperature at which damage may occur will differ depending upon the structure used, the rate of thermal expansion of most materials decreases rapidly below room temperature, and there is almost no thermal expansion below 80° K. Nitrogen is preferred for this application because it has a substantial heat capacity of almost 300 joules/gram (j/g) between about 2° K. and about 80° K. As a result, the volume of nitrogen needed to absorb a substantial quantity of heat is not impractical for this application. In addition, nitrogen is relatively safe and inexpensive. Other suitable materials include hydrogen, neon and oxygen, but hydrogen and oxygen are dangerous, and neon is relatively expensive.

At the temperature of the liquid helium, nitrogen is solid at the operating pressures in the system 12.

The layer 44 of nitrogen or the like is contained in a plurality of channels 46 which surround the coil 16 and maintain the nitrogen in thermal contact with the case 30. A plurality of electrically nonconductive lines 48 and manifolds 50 are provided as needed for entry and escape of the nitrogen from nitrogen tanks 52. The manifolds 50, the lines 48 or a portion of the lines 48 may be any suitable electrical insulation, such as fiberglass, phenolic or the like. Insulation is needed to prevent the turns of the coil from being shorted.

The nitrogen may be poured into the coil 16 in liquid form and further cooled by the liquid helium to freeze the nitrogen. When the nitrogen in the channels 46 freezes, the manifolds 50 may be drained. The lines 48 may be connected to the tops of the cases 30, as shown, or a side of the cases 30. Connection to the top is preferred, however, because it permits the nitrogen to escape more easily as it vaporizes, without displacing nitrogen which is still in the liquid or solid state.

The fins 28 provide an increased surface area for thermally coupling the coil 16 to the nitrogen and maintain the nitrogen in a more uniform distribution around the coil 16 as the nitrogen melts and vaporizes. Holes may be provided in the fins 28, if desired, for better distribution of the nitrogen.

A plurality of vents 54 may be provided in the manifolds 42 to release the helium if a malfunction occurs. It may be necessary to mechanically isolate the refrigeration units 36 from the manifolds 50 under such circumstances. If the vents 54 are adjusted to remain closed until the helium reaches a pressure of about 30 psi, for example, helium will be released from substantially all of the vents 54, and most of the helium will escape. It should take only a few seconds to build such pressure.

A reasonable energy density in the conductor wires is about 400 j/g. If the filaments become normally conductive due to a malfunction, most of the current transfers to the tube 26 because it has much lower resistance than the filaments in normal conduction. Some current may flow through the case 30, as well. The heat capacity of the aluminum in the tube 26 and the case 30 from 2° K. to 80° K. is only about 9 j/g and even to about 300° K. is only 170 j/g. Thus, the mass of the tube 26 and the case 30 would have to be exceedingly high to absorb the total heat generated by the dissipation of an energy density of about 400 j/g without a substantial rise in temperature. In order to maintain a temperature below about 80° K., over 44 grams of aluminum would be needed for every gram of superconductor material having an energy density of about 400 j/g.

Nitrogen melts at about 63° K., and boils at about 77° K. The heat capacity of nitrogen from 2° K. to about 80° K. is almost 300 j/g, which is adequate for this invention because a high ratio by weight of nitrogen to superconductor material is not required. For each gram of superconductor, only about 1.33 grams of nitrogen need be provided. In addition, the cavities are easy to fill, and once they are filled and the nitrogen is frozen, maintenance or replacement is not required for long periods of time.

In addition to the added heat capacity of the nitrogen, further protection is provided because the helium may be easily and quickly expelled from the system when a portion of the coil changes state and becomes normally conducting. The heat generated by the normal conducting region of the coil 16 will vaporize some of the helium, creating pressure which will clear the helium from a larger portion of the coil 16. With the helium removed, large portions of the coil 16 become normally conductive, which distributes the heat loss and causes helium to boil in other parts of the coil and expel the liquid helium from substantially the entire coil, causing substantially the entire coil to go normal relatively promptly. The presence of the nitrogen does not hinder the normal region propagation because its large heat capacity comes at a temperature well above the transition temperature of the coil 16. In addition, good thermal contact is provided between adjacent turns of the coil 16 by the support structure 32 so that the normal region may propagate easily from turn to turn.

In operation, the nitrogen chambers in the channels 46 may be filled with gaseous or preferably liquid nitrogen or the like, and cooled by pouring liquid helium into the center section 38 of the coil 16. The liquid helium, which is in thermal contact with the coil 16 and the nitrogen, cools the coil 16 to a temperature below the transition temperature of the filaments, which is also below the freezing temperature of the nitrogen. The frozen nitrogen, which is also in thermal contact with the coil 16, provides a thermal capacitance which absorbs excess heat generated by the coil 16 in the event that the filaments in at least a portion of the coil 16 suddenly become normal conducting for a substantial period of time and a significant amount of the stored energy is converted to heat in the tube 26, the fins 28 and the case 30. The volume of nitrogen is sufficient to absorb substantially all of the heat generated during such an energy conversion, while maintaining the coil 16 and other components of the system 12 below a safe temperature, such as 80° K. The rapid expulsion of the helium encourages the normal conducting portion to propagate throughout the coil 16, which distributes the energy conversion throughout the system 12 and prevents "hot spots" from being created which are likely to cause damage.

The advantages of this invention are now apparent. The coil in the load-leveling system is protected from malfunctions without current leads, switches and the like. The amounts of nitrogen required are relatively small. Nitrogen is safe and inexpensive, and maintenance is not required for long periods of time.

In essence, this invention relates to the use of a substance as thermal capacitance which has sufficient heat capacity above the transition temperature of the superconducting material to absorb the excess heat generated by the stored energy without permitting the system to heat beyond a safe temperature. Many combinations of materials and elements meet this criteria. While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for protecting a superconducting magnetic energy storage system having a coil storing energy in the magnetic field of said coil from damage caused by a change of state, occurring at a transition temperature of at least a portion of said coil from superconducting to normal conducting, and the consequent dissipation of said stored energy, said method comprising the steps of disposing a thermal capacitance in thermal contact with said coil, said thermal capacitance being formed by freezing in situ a substance that is solid at the operating pressure of said system at a temperature substantially above the transition temperature of said coil and that vaporizes at a temperature below the temperature at which said system is damaged, the volume of said substance providing thermal capacity upon vaporization of said substance to dissipate substantially all of said stored energy without permitting said system to heat to said temperature at which said system is damaged, normally cooling said coil and said thermal capacitance to a temperature below the transition temperature of said coil by providing liquid helium in thermal contact with said coil and said substance, upon the transition of a region of said coil to normal conducting for more than a very short period of time, propagating said normal region over substantially all of said coil by removing said liquid helium from thermal contact with a substantial part of said coil, and utilizing said thermal capacitance to absorb heat thereby generated in said system by said stored energy to maintain the temperature of said system below the temperature at which said system is damaged.

2. The method of claim 1 wherein said substance consists essentially of nitrogen.

3. The method of claim 1 wherein said liquid helium is removed by boiling a portion thereof within said coil by heat generated by said normal region, and driving liquid helium therefrom by the resulting gas pressure.

4. Apparatus for protecting a superconducting magnetic energy storage system having a coil storing energy in the magnetic field of said coil from damage caused by a change of state, occurring at a transition temperature of at least a portion of said coil from superconducting to normal conducting, and the consequent dissipation of said stored energy in said portion of said coil, comprising a thermal capacitance in thermal contact with said coil, said thermal capacitance being formed of a substance that is frozen in situ at operating pressure at a temperature substantially above the transition temperature of said coil and that vaporizes below the temperature at which said system is damaged, the volume of said substance providing thermal capacity upon vaporization of said substance sufficient to dissipate substantially all of said stored energy without permitting said system to heat to said temperature at which said system is damaged, liquid helium in thermal contact with said substance and said coil for normally cooling said coil and said thermal capacitance to a temperature which is low enough so that said coil is in its superconducting state, and means for propagating any normal region that develops for more than a very short period of time in any portion of said coil over substantially all of said coil by removing said liquid helium from thermal contact with a substantial part of said coil, whereby said substance absorbs heat generated in said normal region by said stored energy to maintain the temperature of said system at or below the temperature at which said system is damaged.

5. The apparatus of claim 4 wherein said substance comprises nitrogen.

6. The apparatus of claim 4 wherein said coil is encased in a generally cylindrical heat radiating tube and has helically wound superconductor filaments in thermal contact with said tube.

7. The apparatus of claim 6 wherein said heat radiating tube comprises aluminum.

8. The apparatus of claim 6 wherein said heat radiating tube is in thermal contact with a plurality of fins extending radially from said tube into said substance.

9. The apparatus of claim 4 wherein said propagation means comprises a plurality of vents distributed around said coil which release said liquid helium when heat generated by said normal region boils a portion of said liquid helium so that said liquid helium develops a predetermined pressure at said vents.

* * * * *

UNITED STATES PATENT AND TRADEMARK OFFICE
CERTIFICATE OF CORRECTION

PATENT NO. : 4,528,609

DATED : July 9, 1985

INVENTOR(S) : John R. Purcell

It is certified that error appears in the above-identified patent and that said Letters Patent is hereby corrected as shown below:

Column 1, line 39, change "n" to --in--.

Column 7, line 65, after "temperature" insert a comma.

Column 8, line 37, after "temperature" insert a comma.

Signed and Sealed this

Twenty-first Day of January 1986

[SEAL]

Attest:

*Attesting Officer*

DONALD J. QUIGG

*Commissioner of Patents and Trademarks*